United States Patent [19]

Svehaug

[11] Patent Number: 5,180,224
[45] Date of Patent: Jan. 19, 1993

[54] TAIL LIGHT COVER

[76] Inventor: Oswald C. Svehaug, 1010 San Ysidro Blvd., San Ysidro, Calif. 92173

[21] Appl. No.: 842,474

[22] Filed: Feb. 27, 1992

[51] Int. Cl.⁵ .............................................. B60Q 1/26
[52] U.S. Cl. ..................................... 362/255; 362/61; 362/293; 340/468
[58] Field of Search ................. 362/255, 256, 61, 293; 313/112; 340/468

[56] References Cited

U.S. PATENT DOCUMENTS

| | | | |
|---|---|---|---|
| 1,468,865 | 9/1923 | Mandalian | 362/255 |
| 1,484,138 | 2/1924 | Leaver | 362/255 |
| 1,625,591 | 4/1927 | Chase | 362/255 |
| 1,663,177 | 3/1928 | Reynolds | 362/256 |
| 2,749,432 | 6/1956 | Dorsey | 362/255 |
| 3,312,814 | 4/1967 | Reading | 362/255 |

Primary Examiner—Ira S. Lazarus
Assistant Examiner—L. Heyman

[57] ABSTRACT

An interim tail light cover has a colored translucent body of red or amber, and snaps onto a taillight when the original lens or colored cover of the tail light has been broken or removed so that the light emitted light retains its red or amber color as is appropriate.

11 Claims, 2 Drawing Sheets

U.S. Patent   Jan. 19, 1993   Sheet 1 of 2   5,180,224
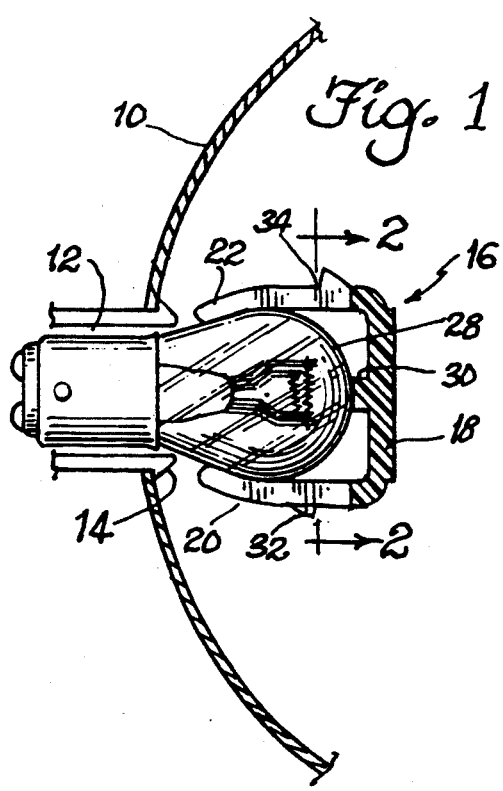
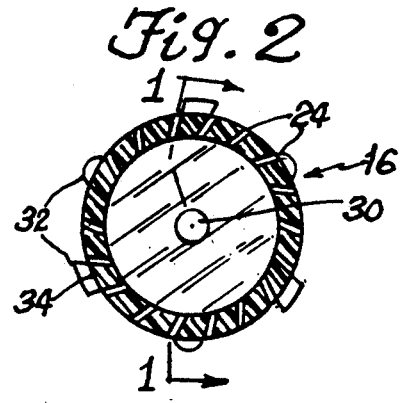
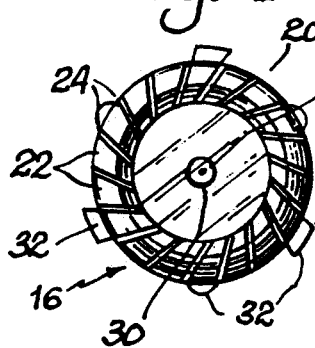
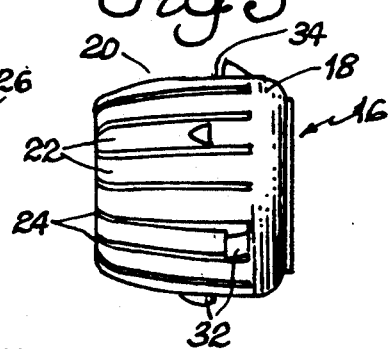
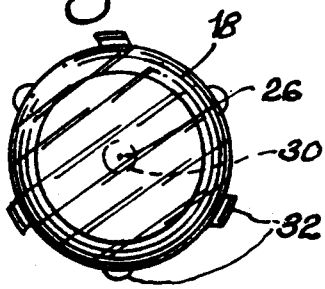
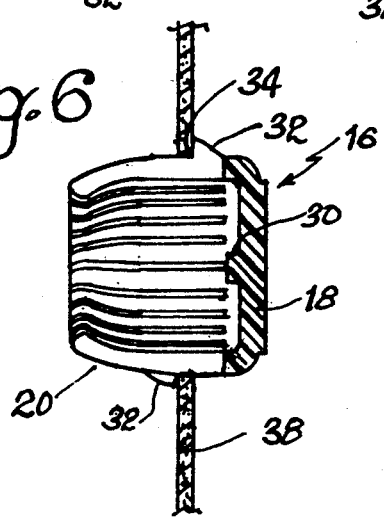
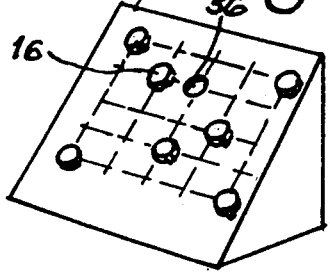

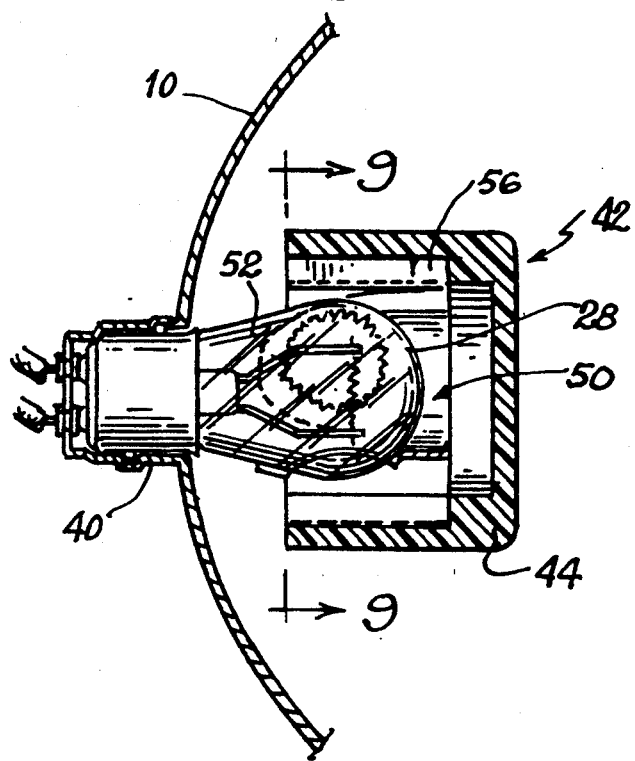
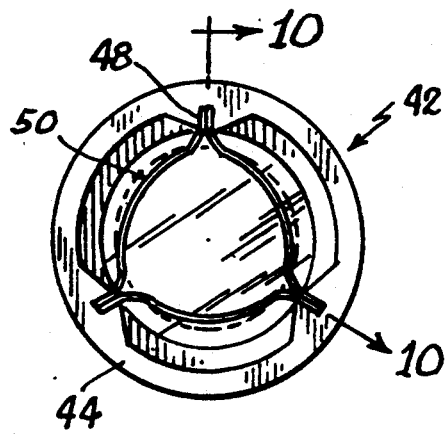
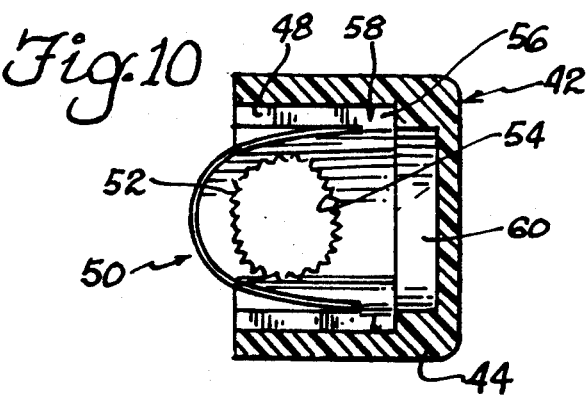
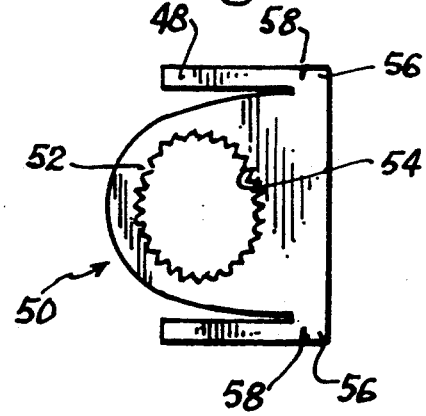
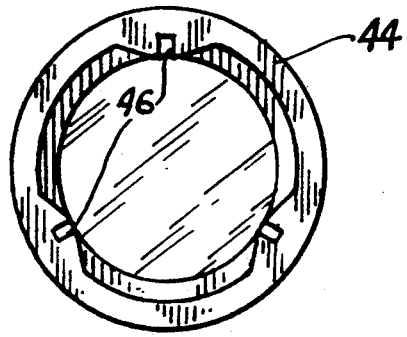

TAIL LIGHT COVER

BACKGROUND OF THE INVENTION

The invention pertains to automobile tail lights and particularly relates to the problem encountered when the tail light cover, which would be a translucent red or amber, is shattered so that the white light from the bulb is emitted.

It is dangerous to be driving with a tail light that is emitting white light, confusing following drivers who associate red light with the rear ends of cars. Although there is some danger of a physical nature from accidents, the more imminent danger is that of getting ticketed for not having red or amber tail lights or brake lights, as is appropriate for the vehicle. In some states this is a non-fixable offense, that is, the fine must be paid whether or not the condition is repaired.

Although car dealers carry replacement covers for most models of cars, or at least recent models, these covers can be very expensive and in many cases are not in stock. If they are not in stock, the motorist risks being ticketed or getting into an accident while waiting for the part. However, the expense of replacing the cover can be a very great problem, especially as the vehicle gets older. As the value of the vehicle continues to do nothing but delcine over time, the cost of replacing a tail light cover will, if anything, go up. It would not be uncommon to find a tail light cover whose cost was a substantial fraction of the overall of the vehicle. Obviously, the more complex the configuration of the tail light cover the greater the cost, and the tendency in modern cars is to produce quite fancy and complex tail light cover configurations.

With all of the gadgets that are sold in automotive stores for virtually any vehicle problem known to man, surprisingly there is nothing that will provide a temporary bulb cover for a tail light bulb to allow the hapless motorist to stay out of trouble with the law and with accidents either until the cover can be replaced, or indefinitely. There is a need for a simple cover which would serve no other purpose than to provide a color filtering effect for the tail light bulb and which would be cheap and simple to install.

SUMMARY OF THE INVENTION

The instant invention fulfills the above stated need by providing a tail light cover which quickly and easily snaps onto the bulb of the tail light, and is compact enough to fit within any other surrounding structure that would be found in any automobile. The invention comes in two forms, one of which is a single plastic molding which defines integral rearwardly extending fingers to clamp around the bulb, the fingers being separated by slanted slits to permit ventilation while preventing emission of white light from the bulb beyond the boundaries of the cover.

In the second embodiment, the translucent colored body is separate from the clamping members, which take the form of three sheet metal stampings which fit into three tracks defined in the plastic body and snap onto the bulbous portion of the bulb to retain the cover in place.

DESCRIPTION OF THE DRAWINGS

FIG. 1 is a side elevation view, partially in section, of a tail light illustrating the first embodiment of the cover in place;

FIG. 2 is a section taken along line 2—2 of FIG. 1;

FIG. 3 is a side elevation view of the tail light cover;

FIG. 4 is an end view, seen from the rear of the tail light cover;

FIG. 5 is a front end elevation view of the tail light cover as would be seen from the right end of FIG. 3;

FIG. 6 is a section taken through a display card with the invention mounted therein for point of sale display;

FIG. 7 illustrates diagrammatically a point of sale card with units of the invention snapped into openings in the card;

FIG. 8 is a vertical partial section through a tail light illustrating a second embodiment of the invention;

FIG. 9 is a section taken along line 9—9 in FIG. 8;

FIG. 10 is longitudinal section taken along lines 10—10 of FIG. 9;

FIG. 11 is a plan view of a typical bulb-engaging clip used in the second embodiment; and FIG. 12 is an end view of the plastic body portion of the cover as would be seen from the left end of FIG. 10 but with the metal clip elements removed.

DETAILED DESCRIPTION OF THE PREFERRED EMBODIMENTS

A typical tail light mounting is shown diagrammatically in Figure one, which the tail light reflector 10 surrounds the bulb, with the bulb socket 12 being engaged in the reflector with detentes 14 which tend to obscure the rearmost portion of the exposed glass of the bulb (in this application, "rear" will be the direction toward the socket end of the bulb, and "front" or "forward" will be in the opposite direction, which is the reverse of the front and rear directions of the vehicle, but is more natural when referring to the tail light cover).

The cover itself is shown in its first embodiment at 16, in which it comprises a body 18 and a rearwardly bulb clamp 20 that is actually part of the body 18 in the preferred embodiment. That is, the body defines rearwardly extending fingers 22 which are separated by diagonal slits 24. The slits 24 are angulated as best seen in FIGS. 2 and 4, so that when visualizing a longitudinal axis of the cover which would pass through the point 26, the slits each define a projected plane which is parallel to the longitudinal axis but which does not intersect it, passing by the axis to one side as can be envisioned from FIG. 4. This configuration permits ventilation to occur through the slits by convection, but prevents any direct light emitted from the lightbulb 28 from escaping the cover.

Ventillation is important both to preserve the life of the bulb and to prevent damage to the cover. The first embodiment is preferrably made of a high-temperature polycarbonate. This fact, together with the ventillation slits, will prevent any damage from occurring to the cover. In order to further promote ventilation, a small boss 30 is defined on the inside of the front of the body 18 to space the rest of the body from the end of the lightbulb as can be seen in FIG. 1.

Additionally, on the outside of the body, a series of spaced nibs 32 together define an annular slot 34 to permit the cover to be snapped into an opening 36 of a counter display 38 and remain securely in place until popped out by a customer for purchase.

It is easy to imagine that this cover is quite inexpensive to produce in quantity, and even when produced in two different colors to accommodate rear lights that must be amber or red, can be provided at a minimal expense per copy. In addition, the mounting of the cover on a light bulb is so extremely simple that even a small child could do it, as the cover need only be pushed over the exposed end of the bulb to snap in place. The inventor has done a considerable amount of checking into the bulb configurations used for tail lights of various vehicles, and has determined that this unit will fit at least 90% of the bulbs now in use for tail lights without conflicting with any surrounding structure.

A slight modification of the invention is shown in FIG. 8, in which a slightly different socket configuration 40 is used. However, the environment shown in FIG. 8 is functionally identical to that shown in FIG. 1 inasmuch as the first embodiment as well as the illustrated embodiment could be used with equal ease of installation.

The second embodiment indicated at 42 utilizes a separate colored translucent body portion 44, also of preferably polycarbonate construction, which defines 3 longitudinal tracks 46 at equally angularly spaced locations as can best be seen in FIG. 12. Into these tracks are inserted the two parallel rails 48 of the bulb-engaging clips 50, one of which is shown in planform in FIG. 11. These clips each have the two parallel rails 48, and a central bulb-engaging portion 52 with a bulb-gripping opening 54 positioned as shown in FIGS. 10 and 11. The bulb-gripping opening may be serrated at 54 to provide more yielding of the sheet metal at the opening area to more closely conform to the contours of the bulb. The clips are preferably made of highly heat-conductive beryllium copper.

The rails 48 preferably each have a bent or deflected portion 56, which may be isolated by a cut 58. As the rails of the clips slide into their tracks into the position shown in FIG. 10, the cut edge of the bent portion 56 will dig into the side of the respective track 46 just enough to securely retain the rail in the track. The bulb-engaging portion 52 of the clip would ordinarily be bent radially inwardly somewhat so that it presses around the outsides of the bulb. This portion may also be stamped to define a concave configuration to more closely approximate the curved surface of the bulb.

When the cover is snapped in place, a space 60 is defined in front of the bulb due to the fact that the tracks are only partially defined into the cover. This space provides a breathing space for the bulb and prevents direct contact between the cover and body of the bulb.

With the three clips pushed into place as shown in FIGS. 9 and 10, and the entire cover snapped onto a bulb as shown in FIG. 8, a simply mounted and secure configuration is established which traps all or virtually of the light which would otherwise be emitted from the tail light as white light. Clearly, the relative dimensions of the parts as shown in FIG. 8 for example, are exemplary only, and could be modified to capture more of, or all of, the white light emitted from a bulb if, in a particular installation, escape of white light is a problem.

The invention thus fulfills a long standing need for safety and law compliance in the automobile industry, and fulfills this need in a way that is very "consumer friendly" in that the avoidance of the possibility of further accidents or tickets after a minor accident can be achieved at a very minimal cost at virtually no inconvenience whatsoever, as snapping the cover onto the bulb is so extremely simple to do.

It is Hereby Claimed:

1. A vehicular light cover to color light emitted from a vehicular lightbulb, said cover comprising:
   (a) a colored translucent body shaped and dimensioned to encircle a substantial portion of said lightbulb and color a substantial portion of light emitted from said lightbulb;
   (b) a bulb clamp for engaging said body directly onto said lightbulb;
   (c) said clamp defining a plurality of pass-through openings therethrough to ventilate heat from said lightbulb; and,
   (d) said body and bulb clamp comprising a unitary plastic molding, and said body including a forward substantially solid portion and a rearwardly directed portion comprising a plurality of separate bulb-engaging fingers defining said bulb clamp, and a plurality of interstitial slits defined between said fingers defining said pass-through openings.

2. A vehicular light cover to color light emitted from a vehicular lightbulb, said cover comprising:
   (a) a colored translucent body shaped and dimensioned to encircle a substantial portion of said lightbulb and color a substantial portion of light emitted from said lightbulb;
   (b) a bulb clamp for engaging said body directly onto said lightbulb;
   (c) said clamp defining a plurality of pass-through openings therethrough to ventilate heat from said lightbulb;
   (d) said body including a forward substantially solid portion and a rearwardly directed portion comprising a plurality of separate bulb-engaging fingers defining said bulb clamp, and a plurality of interstitial slits defined between said fingers defining said pass-through openings;
   (e) said body and bulb comprising a unitary plastic molding; and
   (f) said body defining a longitudinal axis and each of said slits defining its own projected plane which does not intersect said axis such that light from said bulb cannot pass directly through said slits.

3. Structure according to claim 2 wherein said body defines a central inner boss to contact the end portion of said bulb to space said body therefrom.

4. Structure according to claim 2 and including outwardly directed nibs on said body which together define an annular seating to permit said cover to be snapped into a mounting hole in a counter display card.

5. A vehicle light cover to color light emitted from a vehicular lightbulb, said cover comprising:
   (a) a colored translucent body shaped and dimensioned to encircle a substantial portion of said lightbulb and color a substantial portion of light emitted from said lightbulb;
   (b) a bulb clamp for engaging said body directly onto said lightbulb;
   (c) said body being unitary and said bulb clamp comprising at least two opposed clips extending forwardly from said body to clamp opposed sides of said bulb; and,
   (d) each of said clips being a sheet metal stamping defining two parallel side rails, and said body defining a pair of parallel tracks seating said siderails therein.

6. Structure according to claim 5 wherein at least one of said siderails defines a bent portion to frictionally engage in the respective one of said tracks.

7. Structure according to claim 6 wherein said bent portion is also slit to define a edge to grip said track.

8. Structure according to claim 5 wherein there are three clips and said body defines three tracks, and each of the rails of each of said clips shares a track with a rail of an adjacent clip.

9. Structure according to claim 8 wherein each of said clips defines a bulb-engaging portion with a cut-out bulb gripping opening therein.

10. Structure according to claim 9 wherein said bulb engaging portions are radially inwardly deflected to more securely grip said bulb.

11. Structure according to claim 10 wherein said bulb gripping openings are serrated to more flexibly grip said bulb.

* * * * *